United States Patent [19]
Huntt

[11] 4,048,714
[45] Sept. 20, 1977

[54] GLASS BONDING OF MANGANESE-ZINC FERRITE

[76] Inventor: Robert L. Huntt, 25007 Woodfield Road, Damascus, Md. 20750

[21] Appl. No.: 697,842

[22] Filed: June 21, 1976

Related U.S. Application Data

[63] Continuation of Ser. No. 586,345, June 12, 1975, abandoned.

[51] Int. Cl.² .............................................. G11B 5/42
[52] U.S. Cl. .................................... 29/603; 360/120
[58] Field of Search ................ 29/603; 360/119, 120, 360/122

[56] References Cited

U.S. PATENT DOCUMENTS

| | | | |
|---|---|---|---|
| 2,711,945 | 6/1955 | Korhei | 29/603 |
| 3,458,926 | 8/1969 | Maissel et al. | 29/603 |
| 3,629,519 | 12/1971 | Hanak | 29/603 |
| 3,795,954 | 3/1974 | Alex et al. | 29/603 |

*Primary Examiner*—Carl E. Hall
*Attorney, Agent, or Firm*—Murray and Whisenhunt

[57] ABSTRACT

A method of minimizing or eliminating reactions between a surface of manganese zinc ferrite and a glass bonding composition applied thereto is disclosed, wherein a barrier layer is formed upon the manganese zinc ferrite surface prior to the application of the glass bonding composition. The barrier layer is a chromium layer about 3 – 170 microinches thick. The resulting product is suitable for use in radio frequency recording apparatus, and especially for multi-core magnetic heads.

9 Claims, 4 Drawing Figures

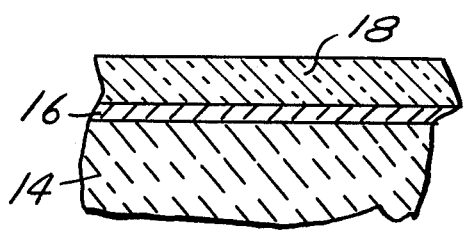
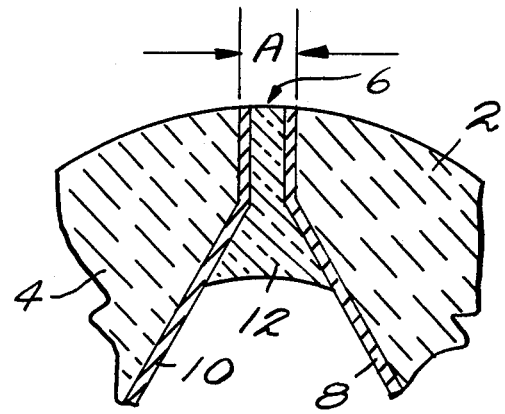
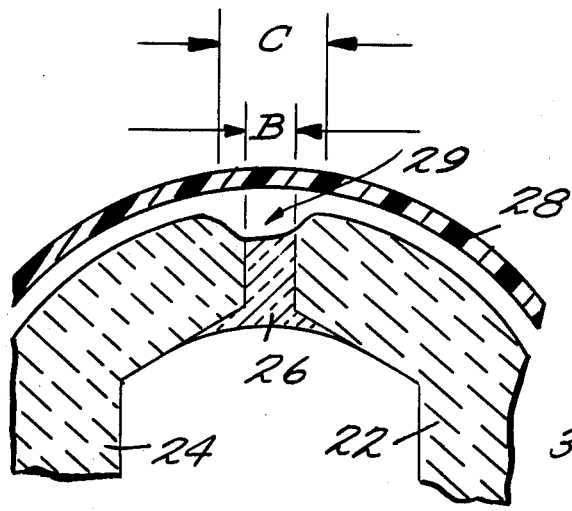
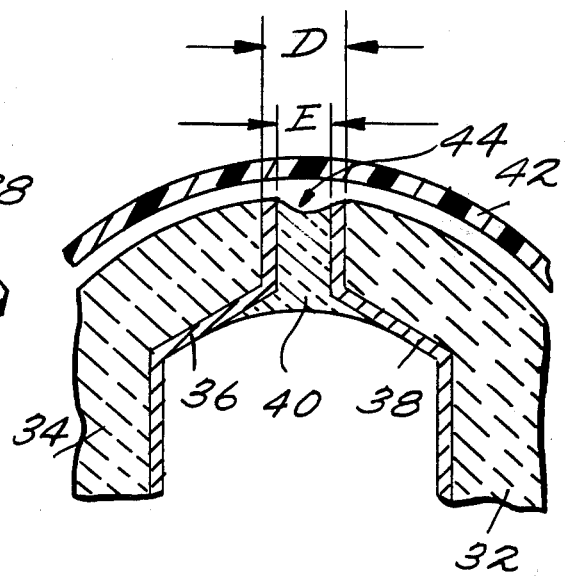

GLASS BONDING OF MANGANESE-ZINC FERRITE

This is a continuation of application Ser. No. 586,345, filed June 12, 1975, now abandoned.

BACKGROUND OF THE INVENTION

My U.S. Pat. No. 3,789,505 of Dec. 5, 1974 discloses a multi-core magnetic head of non-magnetic and magnetic ceramic material, especially ferrite materials. The magnetic ferrite material is glass bonded to the non-magnetic ferrite material. The disclosure of my earlier patent is hereby incorporated by reference.

U.S. Pat. No. 3,024,318 to Duinker et al. discloses the use of a glass gap spacer for magnetic heads.

The prior art has been unable to utilize the properties of manganese-zinc ferrite material as the magnetic ceramic of such magnetic heads, as the manganese-zinc ferrite has an affinity for oxygen and reacts with air as well as with the glass bonding composition. The reaction between the glass and the ferrite produces stresses in the ferrite, which have resulted in mechanical defects in the ferrite.

The technique of glass bonding ferrite materials for recording head applications has long been an accepted method in the prior art for producing gaps in magnetic materials, with the gaps generally ranging from 10 – 250 microinches in width, and occasionally as great as 500 microinches in width. However, the heads produced by the conventional glass bonding technique have used nickel-zinc ferrite materials and not manganese-zinc ferrite materials, because of the above manganese-zinc ferrite reaction problem. The glass actually appears to etch away the surface of manganese-zinc ferrite, and the glass may migrate into the boundaries of the ferrite.

Various techniques can occasionally result in glass bonded manganese-zinc ferrites with reduced reaction between the glass and the manganese-zinc ferrite. Such techniques include, for instance, the use of a vacuum in the glass bonding step. However, the prior art has never been able to eliminate the reaction between the glass and the manganese-zinc ferrite.

The Treptow U.S. Pat. No. 3,029,559 discloses a method of bonding glass to metal surfaces using an interface layer of various finely-divided metals, including nickel, iron, cobalt, platinum, molybdenum, tungsten, copper, silver and gold. These metals are applied to the substrate surface in the form of powders, and sintered in a non-oxidizing or reducing atmosphere. The amount of intermediate layer applied is insufficient to form an integral film, and the patentee desires to form a joint bonding of the glass to both the substrate and the metal sintered thereon (note column 3, first full paragraph).

The Rohrer U.S. Pat. No. 3,404,968 is directed to solving problems of metal embrittlement and disintegration by oxidation associated with the manufacture of glass-to-metal seals. The patentee forms a first intermediate layer of nickel and chromium above a metal substrate, and then forms a second layer of chromium oxide, preferably by oxidizing chromium in the first layer. The glass is then bonded to the chromium oxide layer.

SUMMARY OF THE INVENTION

The present invention includes a process for at least minimizing the reaction between a manganese-zinc ferrite surface and a glass composition used to bind the manganese-zinc ferrite surface in a magnetic head. A barrier layer about 3 – 170 microinches thick is first formed upon the surface of the manganese-zinc ferrite, and then the glass bonding composition is applied to this barrier layer, which effectively separates the ferrite and the glass so as to minimize, and in most instances eliminate, reaction thereinbetween. Thus, a magnetic head may include a block of non-magnetic ceramic material and pieces of shaped manganese-zinc ferrite material which are glass bonded together. The aforesaid layer of barrier material, interposed between the manganese zinc ferrite and the glass, is of chromium.

DESCRIPTION OF THE INVENTION

The present invention is useful in the production of record heads of manganese-zinc ferrite material, in applications for radio frequency recordings. Such applications include flying heads, and both contact and non-contact mode record heads. A very suitable type of record head is disclosed in my aforesaid U.S. Pat. No. 3,789,505. The record head will comprise a series of magnetic pole pieces with gaps between the pole pieces containing the glass bonding composition.

The surface of the manganese-zinc ferrite is protected from reaction with the glass by interposing a barrier layer of non-magnetic material. This barrier layer, generally about 3 – 170 microinches thick, preferably 5 – 100 microinches thick, and most preferably about 10 – 70 microinches thick, may be applied by various techniques, although radio frequency sputtering has been found definitely preferable. The barrier layer should have the following characteristics:

A. It should be substantially paramagnetic,

B. It should exhibit good adhesion to the ferrite surface,

C. It should not react with the glass,

D. It should be able to withstand the curing conditions for the glass bonding step, which generally involves a temperature of 700° C. or less.

E. It should have a coefficient of thermal expansion reasonably close to that of the manganese-zinc ferrite and that of glass. (These coefficients are about 10.0 – 11.0).

The above characteristics will be met when the barrier layer is of chromium. Other metals will form barrier layers but do not have the overall balance of properties that is exhibited by chromium. However, in some instances it may be permissible to use one of these other metals, which include metals of Group IVB, VB, VIB or VIII of the Mendeleef Periodic Table, except iron, and also tin, aluminum, magnesium, barium and beryllium. The preferred materials of this group of metals are zirconium (or zirconia, zirconium oxide), platinum, molybdenum and titanium. Examples of Group IVB metals are titanium and zirconium. Vanadium is an example of a group VB metal, but because of the known tendency of vanadium to oxidize, an inert atmosphere should be utilized. Examples of Group VIB metals are molybdenum and tungsten, and examples of Group VIII metals include platinum, nickel and rhodium. As iron is magnetic, it is unsuitable for use in the present invention.

In addition to radio frequency sputtering, or R.F. sputtering, various other methods of forming the barrier layer may be utilized. For instance, D.C. sputtering or vapor deposition techniques may be utilized. However, poor adherence of the barrier layer to the ferrite surface has been noted with these other techniques, and therefore the R.F. sputtering technique is greatly preferred. The R.F. sputtering technique is a conventional method of applying a layer of coating of one material on another, and is generally conducted at a temperature around ambient temperature, with water cooling of the apparatus being utilized because of exothermic heat generation. The R.F. sputtering step is not temperature dependent, so that the particular temperature chosen is not critical.

The atmosphere in which the R.F. sputtering is conducted is an inert atmosphere, such as argon, helium, nitrogen, etc. These atmospheres are conventional for R.F. sputtering processes.

Generally around 2,000 watts of radio frequency power will be utilized in the R.F. sputtering step, although this can vary widely, e.g., from 500 or less watts to 5,000 or more watts. The time required to form the desired thickness of sputtered material will vary according to a number of process parameters, as known to the art, and may range, for instance, from 15 minutes to 5 hours.

The total gap between magnetic manganese-zinc ferrite pieces will generally be from 10 – 500 microinches, and generally from 40 – 200 microinches. It has been found preferable to have a symmetrical structure in such gap for better wear characteristics, and thus it has been found preferred to have the gap filled with a layer of chromium barrier material, a layer of glass, and then another layer of chromium barrier material, all of approximately equal thickness. Chromium, for instance, has better wear characteristics than glass, and a gap filled with layers of chromium-glass chromium, all of approximately equal thickness, exhibits substantially better wear resistance than a structure having a gap of similar width and entirely filled with glass. As will be appreciated by consideration of FIGS. 2 and 3 of the accompanying drawings, as described hereinafter, the use of substantial amounts of chromium barrier layers in the gap between the record head pole pieces results in a structure having considerably improved wear characteristics. The glass bonding agent layer will normally have a thickness of at least 3 microinches, and, as indicated hereinabove, is more preferably of about the same thickness as each layer of chromium barrier material. The use of this embodiment of the present invention results in record head assemblies exhibiting as much as a five-fold increase in wear life.

The present invention exhibits its most significant improvements when used with manganese-zinc ferrite pole pieces, as an improvement in the elimination of the reaction of the ferrite with the glass will be noted, as well as, in some instances, a decided improvement in wear characteristics of the resulting head assembly. However, it is also possible to use the chromium barrier layers of the present invention, in layers of substantial thickness — e.g., each layer of at least 25% of the total gap thickness — with nickel-zinc ferrite pole pieces, whereby the resulting head assembly exhibits improvements in wear characteristics similar to that obtained with manganese-zinc ferrite pole pieces. As mentioned hereinbefore, the nickel-zinc ferrites do not have a significant glass reaction problem, so the use of very thin chromium layers does not result in significant improvements in the resulting recording/reproducing head.

Manganese-zinc ferrite compositions are well known to the art. Typically, such materials may have the following composition:

MnO:15 – 47 mol %
ZnO:5 – 25 mol %
$Fe_2O_3$:48 – 55 mol %

Preferably the ferrite material will be hot pressed, although other methods of producing the ferrite shaped article may be utilized.

The glass bonding composition which can be used in the process of the present invention is generally a high lead glass, when the ferrite is a manganese-zinc ferrite, and is generally a high sodium glass when the ferrite is a nickel-zinc ferrite. Changes in the glass composition are generally required in order to approximate the coefficient of thermal expansion of the respective ferrites. Suitable glass bonding compositions are known to the prior art, and are disclosed in, e.g., U.S. Pat. Nos. 3,024,318 and 349,045 and British Pat. No. 1,144,285, the disclosures of which are hereby incorporated for reference for, e.g., the teachings of such glass bonding compositions therein. The glass bonding composition may be a vitrified glass composition, a devitrified glass composition, or mixtures thereof.

DESCRIPTION OF THE DRAWINGS

The present invention will be understood more readily with reference to the accompanying drawings, wherein:

FIG. 1 represents, in the broadest aspect of the present invention, a cross-section of an assembly of ferrite, chromium barrier layer, and glass bonding agent layer;

FIG. 1-A is a cross-sectional view of the pole pieces and gap of a magnetic recording head embodying the present invention;

FIG. 2 is a cross-sectional view of the pole pieces and gap of a prior art magnetic recording head, illustrating gap wear caused by use of the head;

FIG. 3 is a cross-sectional view of the pole pieces and gap of a magnetic recording head according to the present invention, illustrating the gap wear caused by recording use.

FIG. 1 represents the invention in its broadest aspect, when applied to manganese-zinc ferrites. That is, any time a manganese-zinc ferrite is to be subjected to a glass bonding step, the present invention may be used to protect the ferrite from attack by and reaction with the glass bonding composition. In FIG. 1-A a manganese-zinc ferrite piece 14, which may be in the form of a thin layer, a massive body, or the like, is covered by a protective layer 16 of chromium, over which is applied the glass bonding layer 18.

In FIG. 1-A, pole pieces 2, 4 are part of an assembly (not shown) of a magnetic recording head, wherein the assembly may be in accordance with my aforesaid U.S. Pat. No. 3,789,505, my copending patent application Ser. No. 382,604, the disclosure of which is hereby incorporated by reference, or in accordance with U.S. Pat. No. 3,495,045. Gap 6, having a width A, is filled by chromium layers 8, 10 and glass layer 12. Chromium layer 8 is R.F. sputtered on pole piece 2 and chromium layer 10 is similarly sputtered on pole piece 4, before the pole pieces are assembled in operating relationship. After the pole pieces are asembled in the proper relationship, they are cemented together by the application of glass bonding layer 12, which application includes a firing step, generally at temperatures less than 700° C.

The embodiment illustrated in FIG. 1-A represents a decided improvement in manganese-zinc ferrite record heads, in that the chemical reaction between the ferrite and the glass bonding agent is substantially eliminated. However, this assembly, as illustrated with rather thin, e.g., 3 to 20 microinch thick, chromium layers, may not significantly improve the wear characteristics of the resulting record head.

FIG. 2 represents a prior art recording head, after being subjected to substantial use, with resulting gap erosion. Pole piece 22, 24, conventionally of nickel-zinc ferrite, are bonded together by glass bonding agent 26. The original pole piece gap has a thickness B. However, gap erosion, caused by the travel of tape 28 over the gap, has resulted in gap erosion in the area 29, resulting in an increase of the effective gap width to thickness C.

FIG. 3 represents an embodiment of the present invention when used to improve the useful life of the record head. Pole pieces 32, 34 are part of a record head assembly (not shown) and are separated by gap D in which are chromium layers 36, 38 and glass layer 40. Layers 36, 38 and 40 are of approximately equal thickness, and the resulting assembly has substantially increased wear life. The travel of tape 42 over the gap area has caused erosion at point 44. However, because of the substantial wear resistance of chromium layers 36, 38, as compared to the glass layer 40, the gap erosion is substantially confined to the glass layer 40. Thus, eroded area 44 has a width E which is less than gap D, and is insignificant in its effect upon ultimate use properties of the assembly.

EXAMPLE OF THE INVENTION

Manganese-zinc ferrite pieces were hot pressed and then formed, lapped and polished into the shape represented by FIG. 2 of my aforesaid pending U.S. patent application, Ser. No. 382,604. The resulting half sections are then placed on a water-cooled (approximately 60° F.) cathode in a Model 776 Vecco High Vacuum System. This system was evacuated and then backfilled with argon gas to a pressure of 5M TORR. The surfaces of the ferrite section were cleaned by back sputtering for 10 minutes. After the cleaning step, the power was reversed and chromium was sputtered onto the ferrite sections, using a 4 inch chromium target piece and a distance of 1½ inches between cathodes. The R.F. power source had a frequency of 13.5 megacycles per second and was operated at 2000 watts of power. A layer of chromium of about 50 microinches thick was applied in about 1 hour of chromium sputtering. The system was then returned to atmospheric pressure and the parts were removed.

The ferrite sections were then glass bonded into holders, of the type disclosed in FIGS. 3 and 4 of my aforesaid copending patent application, Ser. No. 382,604. Two glass bonding compositions were used in the glass bonding step, a high lead content vitreous glass and a high lead devitrifying solder glass. The vitreous glass, which was used to fill the gap between the pole pieces, had the following composition:

PbO:83%
$B_2O_3$:10%
$SiO_1$:4%
$Al_1O_3$:3% and the devitrifying solder glass, which was used to glass bond the area immediately adjacent to the gap area to provide reinforcing strength, had the following composition:

PbO:80%
$B_2O_3$:10%
$Z_nO$:5%
$SiO_2$:3%
BaO:2%

The two glass bonding compositions were placed in their respective locations, and then the pole pieces were glass bonded into the holders at temperatures about 500° C. in an ambient air atmosphere until the glass had liquified and completely filled the areas to be bonded (about 3 to 5 minutes). The glass bonded assemblies were then allowed to cool and were subjected to the further manufacturing steps described in my aforesaid copending patent application, Ser. No. 382,604.

In other instances it may be desirable to utilize the magnetic recording head assembly method in my U.S. Pat. No. 3,789,505, which utilizes two separate glass bonding steps. It will be readily appreciated that the first glass bonding step must be with a glass bonding composition which has a melting point substantially above that of the second glass bonding composition. For the first, high melting point glass composition I prefer to utilize the devitrifying solder glass described above, modified by the addition of a high temperature stabilizer composition. A suitable high temperature stabilizer composition is as follows:

SiO:70%
$Al_2O_3$:20%
$Li_2O$:3 – 4%
$TiO_2$:0.5%
$Zro_2$:0.5%
CaO:2 – 4%
$Na_2O$:1%

The devitrifying solder glass will generally be mixed with the high temperature stabilizer in a weight ratio of about 10:1 (although amounts of stabilizer corresponding to a weight ratio as much as 5:1 may be used in some instances) of devitrifying solder glass:high temperature stabilizer composition.

What is claimed is:

1. A process for increasing the wear resistance of a magnetic recording/reproducing head, said head comprising a core of magnetic hot-pressed manganese-zinc ferrite material having opposing pole faces defining at least one gap, while also minimizing or eliminating reaction between the manganese-zinc ferrite pole faces and a glass bonding composition applied thereto, said process comprising first forming a layer of chromium on the pole faces by R.F. sputtering the chromium thereon, each chromium layer being of a thickness of at least 25% of the width of said gap, and thereafter glass bonding the resulting chromium layers together by applying a high lead glass bonding composition at least 3 microinches thick to the area of the gap and firing the glass bonding agent at a temperatuer of no greater than about 700° C to adhere to chromium layers together with the glass bonding agent.

2. A process according to claim 1, wherein the high lead glass bonding agent is fired at a temperature of no greater than about 500° C.

3. A process according to claim 2, wherein said glass bonding composition is bonded to said chromium layers at a temperature of about 400° to about 500° C.

4. A process according to claim 1, wherein the total thickness of said chromium layers and said glass bonding composition layer is about 10 to about 500 microinches.

5. A process according to claim 4, wherein each chromium layer has a thickness of about 3 to about 170 microinches.

6. Process according to claim 5, wherein each chromium layer is about 5 to 100 microinches thick.

7. Process according to claim 6, wherein each chromium layer is about 10 to 70 microinches thick.

8. Process according to claim 1, wherein each of said chromium layers and the glass bonding composition layer are of substantially the same thickness.

9. Process according to claim 1, wherein the total thickness of said chromium layers and said glass bonding composition layer is about 40 to about 200 microinches.

* * * * *